(12) United States Patent
Hortobagy

(10) Patent No.: US 12,728,704 B2
(45) Date of Patent: Sep. 8, 2026

(54) AIR VENT WITH ADJUSTABLE AIR OUTLET DIRECTION

(71) Applicant: Weber GmbH & Co. KG, Dillenburg (DE)

(72) Inventor: Frank Hortobagy, Steffenberg (DE)

(73) Assignee: Weber GmbH & Co. KG, Dillenburg (DE)

( * ) Notice: Subject to any disclaimer, the term of this patent is extended or adjusted under 35 U.S.C. 154(b) by 378 days.

(21) Appl. No.: 18/505,207

(22) Filed: Nov. 9, 2023

(65) Prior Publication Data

US 2024/0174054 A1 May 30, 2024

(30) Foreign Application Priority Data

Feb. 16, 2023 (DE) ........................ 102023103893.1

(51) Int. Cl.
*B60H 1/34* (2006.01)

(52) U.S. Cl.
CPC ... *B60H 1/3421* (2013.01); *B60H 2001/3471* (2013.01)

(58) Field of Classification Search
CPC .......... B60H 1/3421; B60H 2001/3471; B60H 1/345; B60H 2001/3478; B60H 1/00614; B60H 1/00671; B60H 1/00835; B60H 1/00857; F24F 2013/1446
USPC ........................... 454/154, 31, 155, 326, 336
See application file for complete search history.

(56) References Cited

U.S. PATENT DOCUMENTS 3,602,127 A * 8/1971 Walker ................. B60H 1/3428 454/316
4,653,386 A * 3/1987 Hayakawa ............ F24F 13/075 454/316
9,370,986 B2 * 6/2016 Londiche .............. B60K 37/20
11,225,126 B2 1/2022 Lee et al.
11,556,239 B1 * 1/2023 Kim ...................... G06F 3/0488
11,679,645 B2 6/2023 Schaal
2002/0081965 A1 * 6/2002 Demerath ............ B60H 1/3421 454/254
2007/0123158 A1 * 5/2007 Shibata ............. B60H 1/00871 454/130

(Continued)

FOREIGN PATENT DOCUMENTS

DE 102014203511 B3 4/2015
DE 102015101101 B3 7/2016

(Continued)

*Primary Examiner* — Avinash A Savani
*Assistant Examiner* — Ryan L Faulkner
(74) *Attorney, Agent, or Firm* — Rogowski Law LLC

(57) ABSTRACT

An air vent (10) with an adjustable air outlet direction (9) has a flow channel (1) with an air entry opening (2) and an air exit opening (3). At least one first blade (5) is pivotable about a first pivot axis (4) relative to the flow channel (1). At least one second blade (7) pivotable relative to the flow channel (1) has a second pivot axis (6) that extends obliquely or vertically to the first pivot axis (4). A single electromotive or manual drive (8) and a coupling device (12) independently displace the blades (5, 7) so as to guide air flow (15). The coupling device (12) has a cam wheel (14) operatively connected to the drive (8), preferably via a rotatably mounted drive element (13), in particular a bevel gear, with a cam forming a cam contour for setting different positions of the first and second blades (5, 7).

15 Claims, 4 Drawing Sheets

(56) References Cited

U.S. PATENT DOCUMENTS

| | | | | |
|---|---|---|---|---|
| 2010/0120347 | A1* | 5/2010 | Gehring | B60H 1/345 454/155 |
| 2018/0126824 | A1* | 5/2018 | Demerath | B60H 1/3428 |
| 2019/0375266 | A1* | 12/2019 | Belzons | B60H 1/0065 |
| 2022/0145970 | A1 | 5/2022 | Groben | |

FOREIGN PATENT DOCUMENTS

| | | | |
|---|---|---|---|
| DE | 102015101254 | B3 | 7/2016 |
| DE | 102018005002 | A1 | 12/2019 |
| DE | 102018220352 | A1 | 2/2020 |
| DE | 102020101678 | A1 | 7/2021 |
| DE | 102021119416 | A1 | 3/2022 |
| DE | 102021106582 | A1 | 9/2022 |
| EP | 3192684 | A1 | 7/2017 |
| EP | 3628891 | A1 | 4/2020 |
| KR | 1020070034793 | A1 | 3/2007 |
| WO | 2020172098 | A1 | 8/2020 |

* cited by examiner

AIR VENT WITH ADJUSTABLE AIR OUTLET DIRECTION

BACKGROUND OF THE INVENTION

The invention relates to an air vent, also called a fresh air grill, with an adjustable air outlet direction.

Air vents can be used, for example, in vehicles, in particular motor vehicles, and generally serve to regulate the air flow that flows out of an air exit opening in the horizontal and/or vertical direction. The air vent can be arranged, for example, in the instrument panel of a motor vehicle.

It is conceivable to use such air vents not only in the vehicle sector but also in fans, air conditioning systems, for example in buildings or other areas where the air flow can be specifically adjusted.

Various apparatuses and methods for adjusting an air flow are known from the prior art. In known air vents, vertically and horizontally aligned air guiding elements or blades can be arranged one behind the other. As a rule, both the horizontally extending blades as well as the vertically extending blades can be pivoted separately or together via a displacement mechanism in order to adjust the direction of the outflowing air.

From DE 10 2021 119 416 A1, a control mechanism for a kinematics in the vehicle interior is known. The control mechanism has a base body, a control link, and at least two output elements. A sliding block element with two degrees of freedom relative to the base body is guided through the control link by alternating movements in two opposing directions of the first degree of freedom and comes into contact with the first and/or the second output element one after the other. In order to implement such a control mechanism as simply as possible, it is proposed that rotational movements are used instead of translational movements.

DE 10 2021 106 582 A1 describes a drive device for independently controlling at least two apparatuses by means of a single drive unit, comprising at least a drive unit, a first transmission unit, at least a first guide element, and a first stationary control element, which comprises a first link arrangement with a switching link. The at least one first guide element can be displaced via the first transmission unit by the drive unit within the switching link of the first link arrangement, wherein at least one guide track is provided in the switching link for each apparatus to be controlled, in which at least one second guide element is arranged. The second guide elements are connected to first transmission elements rotatably mounted on the first stationary control element, which can be set into rotation via the second guide elements in accordance with the displacement of the at least one first guide element, wherein the first transmission elements are connected or connectable to the respective apparatus assigned thereto.

For example, an air vent for a motor vehicle is also known from DE 10 2018 005 002 A1.

DE 10 2015 101 254 A1 relates to a drive device for displacing at least two apparatuses.

From DE 10 2020 101 678 A1, an adjustment device for changing a mass flow in a motor vehicle is known.

The disadvantage of the well-known air vents is the complex structure with the effort-intensive kinematics.

Based on the disadvantages described above, the invention addresses the problem of specifying an improved air vent that has a simple structure and a particularly comfortable pivoting of the blades in as easy, space-saving, and cost-effective a manner as possible.

SUMMARY OF THE INVENTION

The invention relates to an air vent with an adjustable air exit direction, with a flow channel having an air entry opening and an air exit opening substantially opposite to the air entry opening.

The air vent is also referred to as a nozzle or air nozzle, wherein the flow channel does not necessarily need to have the shape of a classic nozzle with a narrowing flow cross-section. In particular, in the installed position of the air vent, it is possible to deflect the air jet both in the vertical direction and in the horizontal direction using exactly one single actuator.

An air flow can flow into the flow channel through the air entry opening and out through the air exit opening.

Furthermore, at least one first blade, for example a horizontal blade, which can be pivoted about a first pivot axis relative to the flow channel, is provided for guiding the air flow, and at least one second blade, for example a vertical blade, is provided, which can be pivoted relative to the flow channel, whose second pivot axis extends obliquely or vertically relative to the first pivot axis.

This is understood to mean, in particular, that the first pivot axis extends vertically to an imaginary or virtual plane, wherein the second pivot axis extends obliquely or parallel to the plane or lies in the plane.

The at least one first blade is, for example, pivotable in a first pivot range between two end positions delimiting the pivot range. The at least one second blade is also pivotable, for example, in a second pivot range about the second pivot axis relative to the flow channel between two end positions.

For the independent displacement of the blades, a single and in particular electromotive or manual drive and a coupling device are provided.

The drive can preferably be designed as an electrical actuator or as an electrically operable actuator, for example as an electric motor. Alternatively, it can also be designed as a manually operated knurling wheel, a lever, a sliding lever, a pull rod, or a toothed rack.

In other words, both the at least one first blade and the at least one second blade can be pivoted about the respective pivot axes by means of the drive, and thus for example electrically or electromotively, so that the blades, which are preferably designed to be inherently rigid or dimensionally stable, can be displaced i.e., pivoted particularly comfortably and in particular automatically, for example by means of a regulation or control system.

Because the first blade and the second blade or the rows of blades can be driven by means of the drive via the coupling device and are thereby pivotable, and because the blades can be pivoted relative to one another by means of the drive via the coupling device, different air exit directions can be set, into which the air flow can flow out of the flow channel and, for example, into the interior of the motor vehicle or into a building.

According to the invention, the coupling device has a cam wheel operatively connected to the drive, preferably via a rotatably mounted drive element, in particular a bevel gear, with a cam forming a cam contour for setting different positions of the first and second blades. However, it is also conceivable that the drive acts directly on the cam wheel. The cams can be designed as rounded protrusions.

The air flow that flows out of the air vent, in particular from the flow channel, is directed or deflected or discharged particularly advantageously, and in particular as needed, by means of the blades. The air vent according to the invention enables the realization of a nozzle kinematics, which has a particularly simple and thus space-saving and cost-effective structure and at the same time enables a particularly advantageous deflection of the air flow that flows out of the air vent.

According to a first advantageous embodiment of the invention, the first and/or second blades are coupled to a respective control arm for controlling the blades. In particular, the cams of the cam wheel can act preferably directly on the control arm in order to set different positions of the first and second blades. This reduces the need for components and achieves a compact design.

According to an advantageous variant of the invention, the cams of the cam wheel act on a preferably spring-loaded first sliding element, which is operatively connected to the first blades, in order to pivot the first blades about the first pivot axis relative to the flow channel.

Alternatively or additionally, it can be provided that the cams of the cam wheel also act on a second sliding element, which is preferably spring-loaded and is operatively connected to the second blades, in order to pivot the second blades about the second pivot axis relative to the flow channel. In this way, an effective and targeted control of the air flow is achieved with just a few components. This allows the transmission of the movement of the cam wheel to the blades to be maintained precisely, for example a position at 0° and at 180°.

According to an advantageous variant of the invention, the first and/or second blades are coupled by means of the respective control lever to the first and/or second sliding element for pivoting the first and/or second blades.

In particular, it can be provided that the first sliding element for the first blades is coupled to a first spring and/or that the second sliding element for the second blades is coupled to a second spring.

According to an advantageous development of the invention, a plurality of first blades and/or a plurality of second blades are coupled to one another respectively for synchronous movement.

The at least one first blade belongs, for example, to a first row of blades, which can comprise the first blade as well as further blades or at least one further blade. The blades of the first row of blades are, for example, arranged sequentially or one after the other along an in particular straight first direction, wherein the previous and following designs for the first blade can also be readily transferred to the other, further blades of the first row of blades and vice versa.

Alternatively or additionally, the at least one second blade can belong to a second row of blades, which can comprise the second blade and a plurality of further blades or at least one further blade. The blades of the second row of blades are, for example, arranged sequentially or one after the other along a second direction, which extends obliquely or vertically to the first direction and in particular straight, wherein the previous and following designs for the second blade can also be readily transferred to the other, further blades of the second row of blades and vice versa.

In a particularly advantageous embodiment of the invention, it is provided that one of the first or second blades can be pivoted about its pivot axis relative to the flow channel and relative to the other blade by means of the cam wheel driven by the drive, due to its cam contour, while a pivoting of the other blade about its pivot axis relative to the flow channel and caused by the drive is omitted.

This is understood in particular to mean that, for example, the first blade is pivotable or pivoted by means of the drive about the first pivot axis relative to the flow channel, while a pivoting of the second blade around the flow channel, being caused by the drive and occurring about the second pivot axis, is omitted.

Alternatively or additionally, it is conceivable that the second blade is pivotable or pivoted by means of the drive about the second pivot axis relative to the flow channel, while a pivoting of the first blade, being caused by the drive and occurring about the first pivot axis, is omitted.

As a result, the air flow can be directed or guided or deflected particularly advantageously by means of the blades, although the blades are or can be coupled via the coupling device to the precisely one drive that is common to the blades.

Because both the at least one first blade and the at least one second blade can be pivoted using the precisely one drive that is common to the blades, the number of parts, the design space requirement, the weight, and the costs of the air vent can be kept at a particularly low level.

Of course, within the meaning of the invention, it is also conceivable that the blades can be pivoted together or simultaneously about the pivot axes relative to the flow channel, for example by means of the drive, via the coupling device.

It has been shown to be particularly advantageous that an output shaft of the drive drives an output gear, in which the drive element coupled to the cam wheel, for example a bevel gear, engages in order to displace the blades. Alternatively, the drive can drive the cam wheel directly, i.e., no output gear is provided, which makes the structure even more compact.

In order to be able to keep the design space requirement, the costs, and the weight of the air vent particularly low, it is provided in a further embodiment of the invention that the drive element is arranged obliquely relative to the output gear, preferably in the angle bisector between the first and second pivot axis.

In a particularly advantageous embodiment of the invention, the cam contour of the cam wheel has subregions, wherein, when the cam wheel is displaced in one of the subregions, one of the blades remains in a static position while the other blade is pivoted.

Alternatively or additionally, it can be provided that one of the blades is pivoted into a static position in a further subregion of the cam contour, while the other blade is not pivoted.

In particular, it has been shown to be particularly advantageous that, due to the design of the cam contour of the cam wheel, when the cam wheel is rotated by approximately 180° starting from an initial position, the first blades achieve at least one position and preferably three static positions, for example “top”, “middle”, “bottom”, and remain there while the second blades perform a complete pivoting movement in each of these static positions, wherein, when the cam wheel is rotated by approximately 181° to approximately 360°, the second blades achieve at least one position and preferably three static positions, for example “left”, “middle”, “right”, and remain there while the first blades perform a complete pivoting movement in each of these static positions.

In a particularly advantageous embodiment of the invention, at least one of the control arms comprises a toothing between two lever arms of the control lever, which leads to a uniform transmission of force, in particular compared to a bolt known from the prior art, which is guided in an elongated hole.

In a particularly advantageous embodiment of the invention, it is provided that the cam wheel and the first and/or the second sliding element are coupled to one another, in particular that the cam wheel has a first and/or a second groove in which the first and/or the second sliding element is guided, preferably by means of a bolt. When the cam wheel has a groove in which a bolt of the sliding element is guided, these could be moved back and forth. The springs could be omitted, and the structure would be more compact.

According to a particularly advantageous embodiment of the invention, at least one of the sliding elements comprises a spring-loaded plunger piece for resilient mounting. These plunger pieces enable the control arms to swerve out of the way in the opposite direction of action of the first or second spring in case of misuse of the air vent. In this way, in the event of an unwanted manual intervention directly into the blades due to improper use (so-called misuse), it can be prevented that the kinematics and the drive are destroyed or damaged.

Further objectives, advantages, features, and applications of the present invention are derived from the subsequent description of an embodiment by way of the drawings. All described and/or depicted features, per se or in any combination, constitute the subject-matter of the present invention, regardless of their summary in the patent claims or their back-reference.

Figure 1:
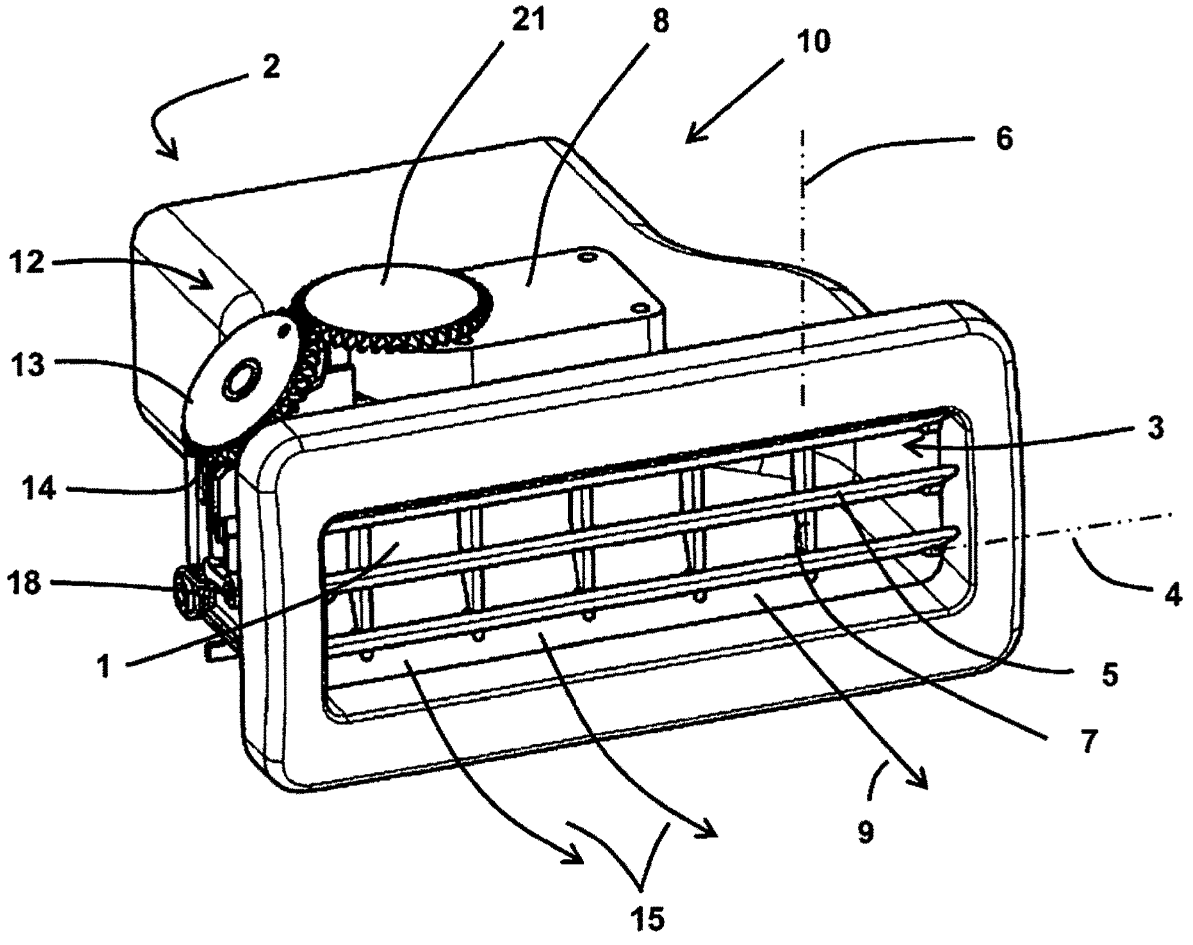
FIG. 1 an air vent with an adjustable air exit direction with a cam wheel in a perspective view, FIG. 2 the air vent according to FIG. 1 in a further perspective view, FIG. 3 a detail view of the air vent according to FIG. 2, and FIG. 4 a further detail view of the air vent.

Identical or identically functioning components are provided with reference numerals based on an embodiment in the subsequently depicted figures of the illustration in order to improve readability.

DETAILED DESCRIPTION

FIG. 1 shows an air vent 10 with an adjustable air exit direction 9 in a perspective view. A flow channel 1 can also be seen, which has an air entry opening 2 and an air exit opening 3 substantially opposite to the air entry opening 2.

Figure 2:
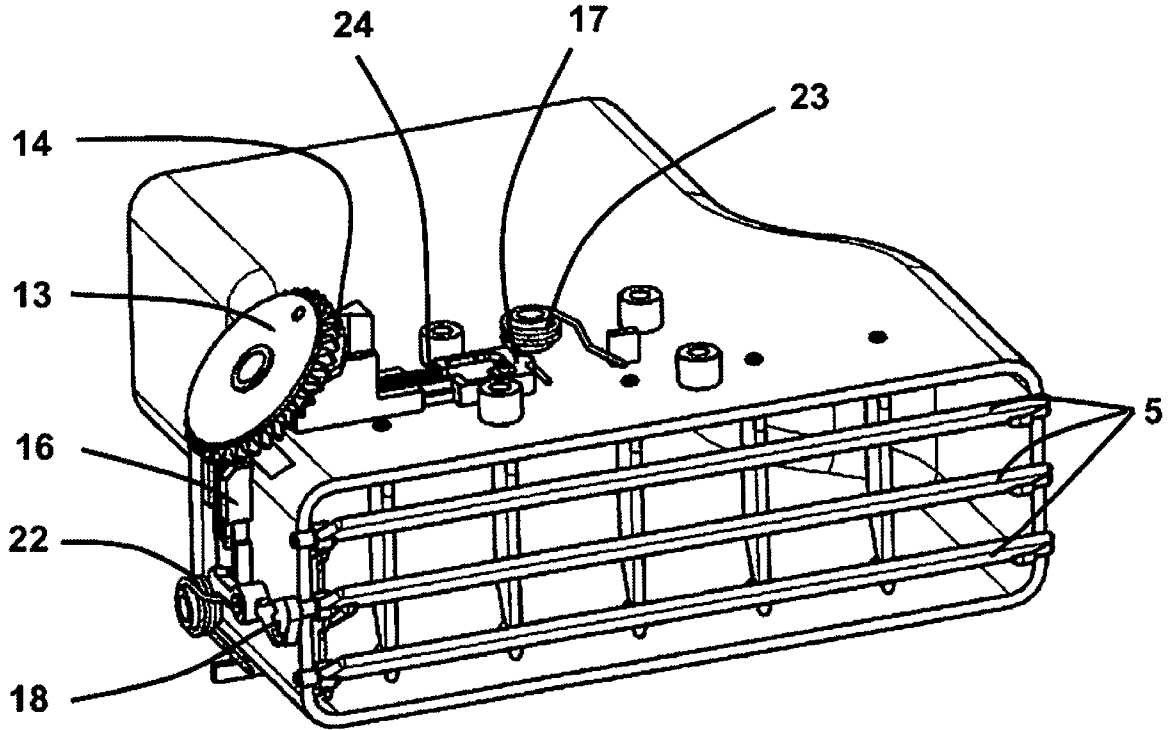

FIG. 2 shows the air vent 10 according to FIG. 1 in a further perspective view, wherein a drive housing and a front panel have been hidden for better clarity.

Figure 3:
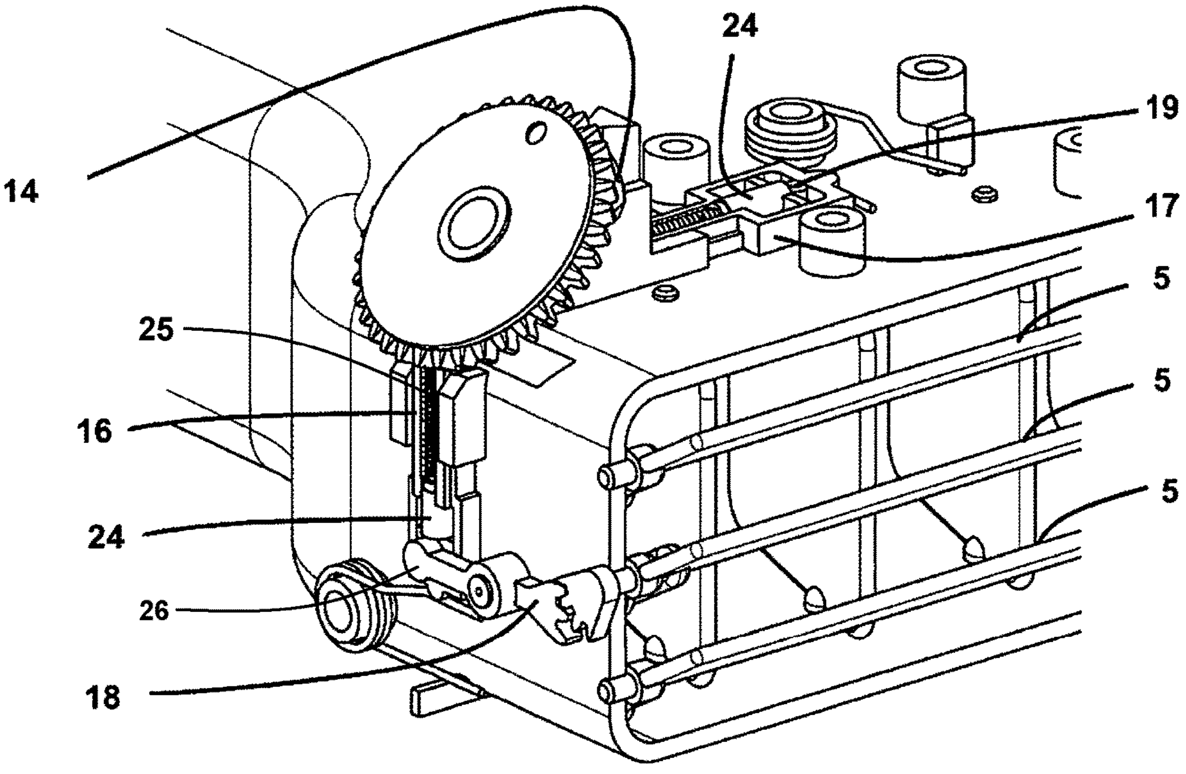
Figure 4:
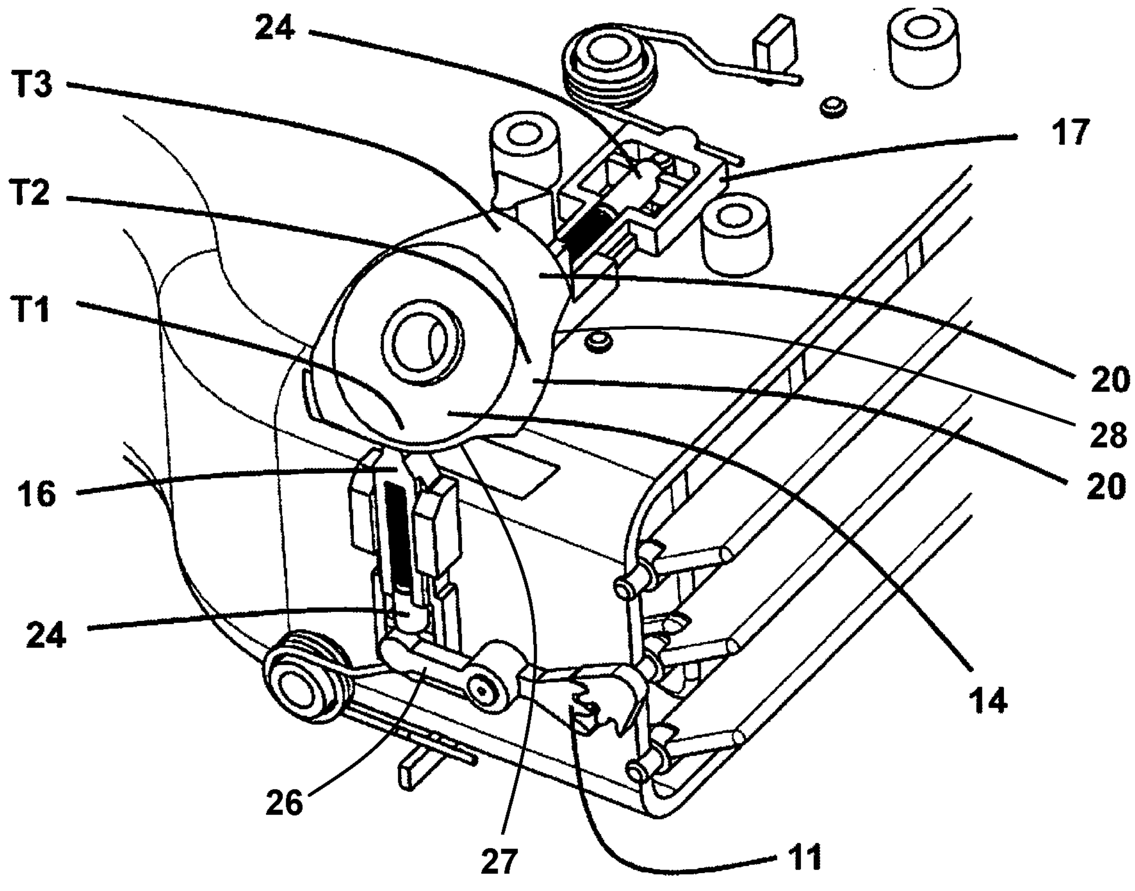

FIGS. 3 and 4 show detailed views of the air vent.

An air flow 15 flows into the flow channel 1 through the air entry opening 2 and out through the air exit opening 3.

FIG. 1 also shows a plurality of first blades 5 that can be pivoted about a first pivot axis 4 relative to the flow channel 1 for guiding the air flow 15. These blades 5 can also be referred to as horizontal blades.

A plurality of second blades 7 that can be pivoted relative to the flow channel 1 can also be seen, whose second pivot axis 6 in the present case extends approximately vertically to the first pivot axis 4 of the first blades 5. These blades 7 can be referred to as vertical blades in the present exemplary embodiment. In other words, the first pivot axis 4 extends vertically to an imaginary or virtual plane, wherein the second pivot axis 6 extends approximately parallel to the plane or lies in the plane.

In the present exemplary embodiment according to FIGS. 1 to 4, a plurality of first blades 5 and/or a plurality of second blades 7 are coupled to one another for a respective synchronous movement.

The first blades 5 are, for example, pivotable in a first pivot range between two end positions delimiting the pivot range. The second blades 7 are also pivotable, for example, in a second pivot range about the second pivot axis 6 relative to the flow channel 1 between two end positions.

For the independent displacement of the blades 5, 7, a single and in the present case electromotive drive 8 or actuator and a coupling device 12 are provided in the present exemplary embodiment. However, a manual drive (not shown) is also conceivable, for example a manually operated knurling wheel, a lever, a sliding lever, a pull rod, or a toothed rack.

In this way, both the first blades 5 and the second blades 7 can be pivoted about the respective pivot axes by means of the drive 8, so that the blades 5, 7, which are preferably designed to be inherently rigid or dimensionally stable, can be pivoted particularly comfortably and in particular automatically, for example by means of a regulation or control system.

According to FIG. 1 and FIGS. 2 and 3, the coupling device 12 has a cam wheel 14 operatively connected to the drive 8, in the present case via a rotatably mounted drive element 13, in the present case a bevel gear, with a cam 20 for setting different positions of the first and second blades 5, 7. These cams 20 form a cam contour of the cam wheel 14. The cam wheel has a first groove 27 and/or a second groove 28 in which the first and/or the second sliding element 16, 17 is guided, preferably by means of a bolt 25.

The cam wheel 14 can be made of plastic or metal. It is also conceivable that it substantially consists of slidable plastic.

As can be seen in particular from FIGS. 3 and 4, the first 5 and/or second blades 7 are coupled to a respective control arm 18, 19 for controlling the blades 5, 7. In a design variant (not shown), the cams 20 of the cam wheel 14 can act preferably directly on the control arm 18, 19 in order to set different positions of the first and second blades 5, 7.

FIGS. 3 and 4 further show that at least one of the control arms 18, 19 has a toothing 11 between two lever arms. This leads to a uniform transmission of force.

As shown in particular in FIG. 4, the cam wheel 14 acts on a first sliding element 16, which is spring-loaded in the present exemplary embodiment. This sliding element 16 is operatively connected to the first blades 5 in order to pivot the first blades 5 about the first pivot axis 4 relative to the flow channel 1.

An output shaft 26 of the drive drives an output gear, in which the first sliding element 16 coupled to the cam wheel 14 (a bevel gear in FIG. 3), engages in order to displace the first blades 5.

In the present case, the cam wheel 14 also acts on a second sliding element 17, which is also spring-loaded and is operatively connected to the second blades 7, in order to pivot the second blades 7 about the second pivot axis 6 relative to the flow channel 1.

In other words, a movement of the cam wheel 14 by the drive 8 causes the first and second blades 5, 7 to be displaced independently.

In the present case, the first 5 and second blades 7 are coupled by means of the respective control arm 18, 19 to the first 16 and second sliding element 17 for pivoting the first 5 and second blades 7.

As can be seen from FIGS. 2, 3, and 4, the first sliding element 16 for the first blades 5 is coupled to a first spring 22, and the second sliding element 17 for the second blades 7 is coupled to a second spring 23. This ensures that the sliding elements 16, 17 always rest on the cam contour of the cam wheel 14. Furthermore, this spring coupling makes it possible for the control arms 18, 19 to swerve out of the way in one direction in the event of an undesired intervention into the blades (misuse). Due to spring-loaded plunger pieces 24, the control arms 18, 19 can also swerve out of the way in a different direction in the case of misuse.

As can be seen from FIGS. 2, 3, and 4, the two sliding elements 16, 17 each have a spring-loaded plunger piece 24, which, in the case of misuse, allows the control arms 18, 19 to swerve out of the way in the opposite direction of action of the first 22 or second spring 23. In this way, in the event of an unwanted manual intervention directly into the blades 5, 7 due to improper use, for example a manual displacement of the blades 5, 7 by a user, i.e., by touching and moving the blades 5, 7, it can be prevented that the kinematics and the drive 8 are destroyed or damaged. This is because, due to the spring-loaded coupling, the blades 5, 7 can be moved manually to a certain extent in the case of improper use.

In addition, it is possible in particular for one of the first or second blades 5, 7 to be pivoted about its pivot axis 4, 6 relative to the flow channel 1 and relative to the other blade 7, 5 by means of the cam wheel 14 driven by the drive 8, while a pivoting of the other blade 7, 5 about its pivot axis 6, 4 relative to the flow channel 1 and caused by the drive 8 is omitted.

The blades 5, 7 can thus be moved independently of one another into numerous positions in order to realize an air flow 15 in almost any desired direction. Different air exit directions can therefore be set, into which the air flow 15 can flow out of the flow channel 1 and, for example, into the interior of the motor vehicle or into a building.

Of course, within the meaning of the invention, it is also conceivable that the blades 5, 7 are pivoted together or simultaneously about the pivot axes 4, 6 relative to the flow channel 1, for example by means of the drive 8, via the coupling device 12.

FIG. 1 further illustrates that an output shaft of the drive 8 drives an output gear 21, in which the drive element, which is coupled to the cam wheel 14 configured in the present case as a bevel gear 13, engages in order to displace the blades 5, 7. The cam wheel 14 and the bevel gear 13 can also be designed integrally. It is also conceivable that drive 8 drives the cam wheel 14 directly.

As can be seen from FIGS. 1-4, the drive element 13 is arranged obliquely relative to the output gear 21, preferably in the angle bisector between the first 4 and second pivot axis 6.

In the present case, the cam contour of the cam wheel 14 has subregions T1, T2, T3, wherein, when the cam wheel 14 is displaced in one of the subregions, one of the blades 5, 7 remains in a static position, while the other blade 7, 5 is pivoted and/or wherein, in a further subregion, one of the blades 5, 7 is pivoted into a static position, while the other blade 7, 5 is not pivoted.

In the present case, when the cam wheel 14 is rotated by approximately 180° starting from an initial position, the first blades 5 achieve at least one position, preferably three positions, for example "top", "middle", "bottom", in which the second blades 7 perform a complete pivoting movement in each of these positions.

In other words, for example, the horizontal blade (first blade) 5 can be displaced to the "up" position and can remain there while the vertical blade (second blade) 7 carries out a complete pivoting movement, i.e., from one end stop to the other. Such a movement of the vertical blade 7 is also possible in other positions, for example in the "middle" or "bottom" position.

Furthermore, it is also possible for the vertical blades 7 to achieve a position such as "left", "middle", or "right" and remain there while the horizontal blades 5 carry out a complete pivoting movement in each of these positions, i.e., from end stop to end stop.

REFERENCE NUMERALS

1 Flow channel
2 Air entry opening
3 Air exit opening
4 First pivot axis
5 First blade (horizontal)
6 Second pivot axis
7 Second blade (vertical)
8 Drive
9 Air exit direction
10 Air vent
11 Toothing
12 Coupling device
13 Drive element (bevel gear)
14 Cam wheel
15 Air flow
16 First sliding element (first blades)
17 Second sliding element (second blades)
18 First control arm (first blades)
19 Second control arm (second blades)
20 Cam
21 Output gear
22 First spring
23 Second spring
24 Spring-loaded plunger piece
25 Bolt
26 Output shaft
27 First groove
28 Second groove
T1, T2 Subregions
T3 Subregions

The invention claimed is:

1. An air vent with an adjustable air exit direction, comprising:

a flow channel, which has an air entry opening and an air exit opening substantially opposite to the air entry opening, configured so that air flows into the flow channel through the air entry opening and flows out through the air exit opening;

two or more first blades each having a respective first pivot axis, said two or more first blades each being pivotable about their first pivot axes relative to the flow channel for guiding the air flow;

two or more second blades each having a respective second pivot axis, said two or more second blades each being pivotable relative to the flow channel about their second pivot axes, wherein the second pivot axes extend obliquely or vertically to the first pivot axes;

a single electromotive or manual drive; and a coupling device that has a cam wheel operatively connected to the drive via a rotatably mounted drive element, said cam wheel having a cam contour for setting different positions of the first blades and the second blades that is configured for independent displacement of the first blades and the second blades so that due to the design of the cam contour of the cam wheel, when the cam wheel is rotated by approximately 180° starting from an initial position, the first blades are selectively oriented into one of a series of three static positions, respectively, and remain there while the second blades are configured to perform a complete pivoting movement in each of these positions; and wherein, when the cam wheel is rotated by approximately 181° to approximately 360°, the second blades are selectively oriented into one of a series of three static positions, respectively, and remain there while the first blades are configured to perform a complete pivoting movement in each of these positions.

2. The air vent according to claim 1, wherein the first blades and/or the second blades are coupled to a respective control arm for controlling the first blades and/or the second blades, and wherein the cam contour of the cam wheel acts on the control arm for setting different positions of the first blades and the second blades.

3. The air vent according to claim 2, wherein at least one of the control arms has a first toothing operatively connected to a second toothing associated with the first blades to transmit rotational force to the first blades.

4. The air vent according to claim 1, wherein the cam contour of the cam wheel acts on a spring-loaded first sliding element operatively connected to the first blades in order to pivot the first blades about the first pivot axis relative to the flow channel and that the cam contour of the cam wheel acts on a spring-loaded second sliding element operatively connected to the second blades in order to pivot the second blades about the second pivot axis relative to the flow channel.

5. The air vent according to claim 4, wherein the first blades and/or the second blades are coupled to the first sliding element and the second sliding element by means of a respective control arm for pivoting the first blades and/or the second blades.

6. The air vent according to claim 4, wherein the first sliding element for the first blades is coupled to a first spring and wherein the second sliding element for the second blades is coupled to a second spring.

7. The air vent according to claim 4, wherein the cam wheel and the first sliding element and/or the second sliding element are coupled to one another via a first groove and/or a second groove in the cam wheel into which the first sliding element and/or the second sliding element is guided.

8. The air vent according to claim 7, wherein the first sliding element comprises a bolt that is guided in the first groove.

9. The air vent according to claim 4, wherein at least one of the first sliding element or the second sliding element has a spring-loaded plunger piece for resilient mounting.

10. The air vent according to claim 1, wherein the two or more first blades and/or the two or more second blades are respectively coupled to one another for synchronous movement.

11. The air vent according to claim 1, wherein either the drive drives the cam wheel directly or an output shaft of the drive drives an output gear, into which the drive element coupled to the cam wheel engages so as to displace the first blades and the second blades.

12. The air vent according to claim 11, wherein the drive element is arranged obliquely relative to the output gear in the angle bisector between the first pivot axis and the second pivot axis.

13. The air vent according to claim 11, wherein the drive element is arranged obliquely relative to the output gear.

14. The air vent according to claim 1, wherein the cam contour of the cam wheel has subregions, and wherein when the cam wheel is displaced in one of the subregions, one of the first blades or one of the second blades remains in a static position, while one of the second blades or one of the first blades is pivoted, and/or wherein, in a further subregion of the cam contour, one of the first blades or one of the second blades is pivoted into a static position, while one of the second blades or one of the first blades is not pivoted.

15. The air vent according to claim 1, wherein the drive element comprises a bevel gear.

* * * * *